Patented Oct. 13, 1953

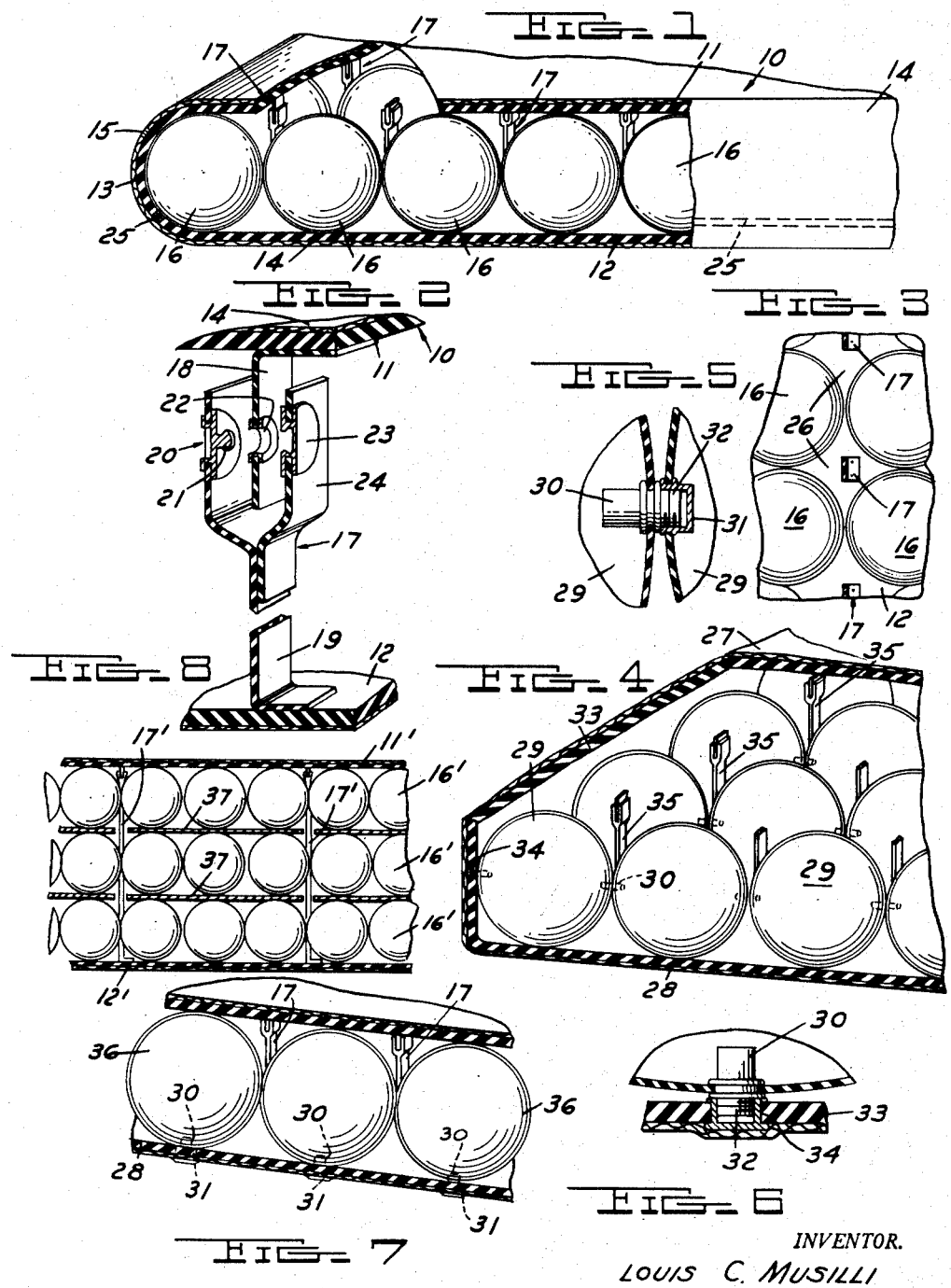

2,655,369

UNITED STATES PATENT OFFICE 2,655,369

SHOCK ABSORBING DEVICE

Louis C. Musilli, Detroit, Mich.

Application November 17, 1949, Serial No. 127,823

9 Claims. (Cl. 267—1)

This invention relates to shock absorbing units and refers more particularly to improvements in units of this type adapted for use in connection with mattresses, cushions and shock resisting supports or equipment.

It is one of the objects of this invention to provide a shock absorbing unit capable of effectively damping impacts or vibrations and which may be adapted for successful application to uses ranging, for example, from a soft mattress or cushion to a relatively rigid flooring or supporting platform.

It is another object of this invention to provide a shock absorbing unit comprising a pair of deformable chambers containing a depressible fluid medium and supported between laterally spaced walls with adjacent sides of the chambers in contact. The arrangement is such that deformation of any one chamber by the weight, impacts or shocks applied to the unit is resisted by the adjacent chamber or chambers. Thus the deformable chambers cooperate with one another to yieldably resist any load, impact or shock applied to the unit.

Still another object of this invention is to provide a shock absorbing unit of the above type wherein the deformable chambers are spherically shaped and are arranged between the laterally spaced walls in rows with the chambers in each row contacting with one another and with the chambers in adjacent rows.

It is a further object of this invention to provide a shock absorbing unit of the general type noted above wherein the laterally spaced walls are held in contact with adjacent sides of the deformable chambers by ties which extend between the walls through spaces provided between the chambers in adjacent rows.

A still further object of this invention is to provide ties having cooperating parts or strips respectively secured at the outer ends to the walls and having means for removably securing the inner ends together. This arrangement greatly facilitates assembly of the unit, and at the same time, firmly holds the walls against the adjacent sides of the chambers so that the latter are prevented from displacement with respect to one another.

In addition to the foregoing the present invention contemplates a shock absorbing unit particularly adapted for installation in cases where extremely heavy loads are accommodated. In accordance with the present invention provision is made in the form of valves for introducing air or some compressible fluid medium into the deformable chambers. If desired the valves may be provided with laterally outwardly extending parts for attachment to suitable cables secured to adjacent deformable chambers. With this construction the valves and associated cables also cooperate to secure adjacent balls in assembled relationship.

The foregoing as well as other objects will be made more apparent as this description proceeds, especially when considered in connection with the accompanying drawing, wherein:

Figure 1 is a perspective view partly in section of a shock absorbing unit embodying the features of this invention;

Figure 2 is a fragmentary vertical sectional view through a part of the unit shown in Figure 1;

Figure 3 is a fragmentary plan view of the unit shown in Figure 1 and having certain parts broken away for the sake of clearness;

Figure 4 is a fragmentary perspective view partly in section of a modified form of shock absorbing unit;

Figure 5 is a fragmentary sectional view showing the manner in which adjacent deformable chambers are connected together by the valve inlet mechanism;

Figure 6 is a sectional view showing the manner in which the valve mechanism may be employed to connect one side wall of the unit to the adjacent deformable chambers;

Figure 7 is a fragmentary perspective view showing another embodiment of this invention; and Figure 8 is a sectional view showing still another form of shock absorbing unit.

It will be understood as this description proceeds that the present invention may be employed in many different instances where it is desirable to yieldably support a load or to absorb or dampen impacts or shocks. In Figures 1 to 3 inclusive the shock absorbing unit is shown as employed in connection with a mattress or cushion. In detail the numeral 10 designates a casing having laterally spaced top and bottom walls 11 and 12 respectively connected together at the edges by side walls 13.

The walls 11, 12 and 13 of the casing 10 are preferably flexible and may be formed of rubber, synthetic rubber or some equivalent material. In the present instance the above walls are shown as covered with a fabric casing 14 having an opening at one side edge which is normally closed by a fastener 15 of the slide type.

Supported within the casing 10 is a plurality of spherically shaped chambers 16 which are preferably formed of rubber, synthetic rubber or some flexible or deformable material. The balls or spherically shaped chambers 16 contain a compressible fluid medium, such for example, as air, and are arranged in rows between the walls 11 and 12. The balls 16 in each row contact with one another and with the balls in adjacent rows so that the deformation of any one ball is resisted by an adjacent ball. Thus regardless of the point of application of the load on the casing 10, all of the balls cooperate to resist deflection of the casing by the load, and in the event the casing is subjected to shock or impacts, the balls will also coact to dampen or absorb the forces resulting from said shocks or impacts.

As shown particularly in Figure 2 of the drawing, the walls 11 and 12 are secured together at predeterminedly spaced points by ties 17. Each tie 17 comprises a pair of strips 18 and 19. The top strip 18 has the outer end vulcanized or otherwise permanently secured to the inner surface of the wall 11, and the outer end of the strip 19 is vulcanized or otherwise permanently secured to the inner surface of the wall 12. The adjacent inner ends of the strips 18 and 19 are detachably secured together by a snap fastener 20. In this connection it will be noted from Figure 2 of the drawing that the inner end of the strip 19 extends in overlapping relation to the strip 18, and the male part 21 of the snap fastener is secured to the inner wall of the strip 19. The strip 18 is formed with an opening 22 therethrough in a position to receive the male part 21 of the snap fastener 20 and permit engagement of the part 21 with the cooperating socket part 23 of the snap fastener 20. The part 23 is secured to a strip 24 positioned at the opposite side of the strip 18 and secured to the strip 19. Thus the ties 17 may be readily engaged during assembly of the unit or disengaged when it is desired to gain access to the interior of the casing 10 for any reason. In this connection it will be noted that the top portion of the casing 10 is preferably formed separately from the bottom portion, and the two portions are removably secured together by a slide type fastener 25. With such an arrangment, the balls 16 may be readily assembled within the casing, and the ties 17 may be conveniently manipulated to firmly hold the walls 11 and 12 in contact with the adjacent sides of the balls. As shown in Figure 3 of the drawings, it will be noted that while the balls 16 in adjacent rows contact each other, nevertheless, due to the spherical nature of the balls, spaces 26 are formed therebetween. The ties 17 are arranged to extend between the walls 11 and 12 through the spaces 26, so as not to interfere with the action of the balls.

In instances where it is desired to use the above shock absorbing principle in connection with heavier duty applications, the construction shown in Figures 4 to 6 inclusive may be provided. This construction embodies a top wall 27 and a bottom wall 28 held in lateral spaced relationship by means of a plurality of balls 29. The balls 29 are arranged in rows with the balls in each row contacting one another and also contacting the balls in adjacent rows.

In the present instance air or some equivalent compressible fluid is introduced into the balls through the medium of valves 30 respectively secured to the balls 29 at one side of the latter and having externally threaded parts 32 which project outwardly beyond the balls. Suitable internally threaded caps 31 are respectively secured to the balls 29 diametrically opposite the valves 30, and are adapted to threadably engage the parts 32 on the valves. In assembly the balls are positioned with the caps 31 in registration with the parts 32 on the valves 30, and adjacent balls are secured together by merely relatively rotating the balls to threadably engage the cap 31 with the valve part 32.

In the event the unit is provided with end walls 33, caps 34 similar to the caps 31 may be secured to one of the end walls in a position to threadably engage the parts 32 on the valves 30 which are connected to the balls lying adjacent the end wall 33. Also if desired the walls 27 and 28 may be connected together by ties 35 similar to the ties 17 previously described.

The embodiment of the invention shown in Figure 7 is similar to the one shown in Figures 4 to 6 inclusive with the exception that the valve caps 31 are actually secured to the bottom wall 28 and threadably engage the valves 30 associated with the adjacent balls 36. In this embodiment the balls 36 are merely attached to the bottom wall 28 of the unit, and are not directly secured together so that it is not necessary to provide valve caps on the balls 36.

The embodiment shown in Figure 8 is similar to the first described form of the invention illustrated in Figures 1 to 3 inclusive, with the exception that the balls 16' are arranged in tiers between the walls 11' and 12'. The balls in each tier are supported in rows in a manner such that the balls in each row contact with one another and with the balls in adjacent rows.

The walls 11' and 12' are connected together by ties 17' which may be of the same general type as the ties 17 previously described. The balls in each tier are separated from one another by sheets 37 which are of a size to extend between adjacent rows of ties 17'. This multiple tier arrangement of balls may be used in instances where the unit is exposed to extremely severe shocks and impacts.

In all of the above embodiments of the invention, the deformable balls are arranged in contact, and are held between the opposed walls against displacement with respect to each other. Thus the balls cooperate to yieldably support loads applied to the unit, and to also absorb shocks or impacts applied to the unit.

What I claim as my invention is:

1. A shock absorbing unit comprising laterally spaced walls, a plurality of deformable spherically shaped separable chambers containing a compressible fluid medium and supported between the walls in side by side relation with the adjacent sides in contact, said chambers being arranged in straight rows extending in directions transverse to each other providing spaces between the chambers, and ties extending from one wall to the other through the spaces between adjacent chambers and having the opposite ends respectively secured to said walls.

2. A shock absorbing unit comprising laterally spaced walls, a plurality of deformable spherically shaped chambers containing a compressible fluid medium and arranged between said walls in straight rows extending in directions transverse to each other providing spaces between the chambers, the chambers in each row being in contact with one another and with the chambers in adjacent rows, means connecting the laterally spaced walls including ties extending through the spaces between the chambers in adjacent rows, said ties having strips secured at their outer ends to the inner sides of one of said walls at spaced points and having cooperating strips secured at their outer ends to the inner sides of the other of said walls, and means for removably attaching the adjacent inner ends of the strips together.

3. A shock absorbing unit comprising laterally spaced walls, a plurality of closed deformable chambers containing a compressible fluid medium and arranged in side by side relation between said walls, means for introducing a compressible fluid medium under pressure into the chambers including check valves respectively secured to the chambers at one side of the latter and having parts projecting laterally outwardly from the chambers, and cap parts respectively secured to the chambers at points diametrically opposite the valves and removably engaged with the projecting parts of the valves of adjacent chambers.

4. A shock absorbing unit comprising a casing having laterally spaced flexible walls, a plurality of deformable spherically shaped chambers containing a compressible fluid medium and arranged within the casing in rows extending between the sides of the casing adjacent said walls, means for introducing a compressible fluid medium under pressure into the chambers including check valves respectively secured to the chambers at one side of the latter and having parts projecting laterally outwardly from the chambers, cap parts respectively secured to the chambers at points diametrically opposite the valves and removably engaged with the projecting parts of the valves of adjacent chambers, and ties extending from one of said walls of the casing to the other of said walls between the chambers in adjacent rows for holding said walls in contact with the adjacent sides of the chambers.

5. A shock absorbing unit comprising a casing having laterally spaced flexible walls, a plurality of deformable spherically shaped chambers containing a compressible fluid medium and arranged within the casing in rows extending between the sides of the casing adjacent said walls, an intake valve for fluid under pressure secured to one of the chambers at one side of the latter and having a part projecting laterally outwardly from said one chamber, and a cap part secured to the adjacent chamber and removably secured to the projecting part of said valve.

6. A shock absorbing unit comprising a casing having laterally spaced flexible walls and having connecting side portions, tiers of spherically shaped deformable chambers containing a compressible fluid medium supported in the casing between said walls, the chambers of each tier being arranged in side by side contact in rows extending between the side portions of the casing, ties extending from one of said walls to the other of said walls between adjacent rows of chambers, and sheets located between adjacent tiers of chambers and between said ties.

7. A shock absorbing unit comprising laterally spaced walls, a plurality of closed deformable chambers containing a compressible fluid medium and arranged in side by side relation between said walls, means for introducing a compressible fluid medium under pressure into the chambers including check valves respectively secured to the chambers and having parts projecting laterally outwardly from the chambers, and cap parts respectively secured to the chambers at points spaced from the valves thereon and removably engaged with the projecting parts of the valves of adjacent chambers.

8. A shock absorbing unit comprising laterally spaced walls, a plurality of closed deformable chambers containing a compressible fluid medium and arranged in side by side relation between said walls, means for introducing a compressible fluid medium under pressure into the chambers including check valves respectively secured to the chambers, and cap parts respectively secured to the chambers at points spaced from the valves thereon and removably engaged with the valves of adjacent chambers.

9. A shock absorbing unit comprising laterally spaced walls, a plurality of closed deformable chambers containing a compressible fluid medium and arranged in side by side relation between said walls, an intake valve for fluid under pressure secured to one of the chambers at one side of the latter, and a cap part secured to the adjacent chamber and removably secured to said valve.

LOUIS C. MUSILLI.

References Cited in the file of this patent

UNITED STATES PATENTS

| Number | Name | Date |
|---|---|---|
| 169,442 | Horton | Nov. 2, 1875 |
| 622,239 | Lane | Apr. 4, 1899 |
| 654,430 | Berger | July 24, 1900 |
| 1,228,783 | Kerivan | June 5, 1917 |
| 2,491,557 | Goolsbee | Dec. 20, 1949 |

FOREIGN PATENTS

| Number | Country | Date |
|---|---|---|
| 3,424 of 1908 | Great Britain | Apr. 15, 1909 |
| 8,507 of 1840 | Great Britain | May 12, 1840 |